United States Patent [19]

Peschka et al.

[11] Patent Number: 4,917,576
[45] Date of Patent: Apr. 17, 1990

[54] METHOD AND APPARATUS FOR CONVEYING A LIQUID

[75] Inventors: Walter Peschka, Sindelfingen; Gottfried Schneider, Stuttgart, both of Fed. Rep. of Germany

[73] Assignee: Deutsche Forschungs- und Versuchsanstalt fur Luft und Raumfahrt e.V., Bonn, Fed. Rep. of Germany

[21] Appl. No.: 168,429

[22] Filed: Mar. 15, 1988

[30] Foreign Application Priority Data

Mar. 28, 1987 [DE]  Fed. Rep. of Germany ....... 3710363

[51] Int. Cl.[4] ............................................. F17D 1/14
[52] U.S. Cl. ....................................... 417/53; 417/86; 417/901; 62/50.1
[58] Field of Search ................... 417/901, 86, 313, 53, 417/137, 144; 62/55

[56] References Cited

U.S. PATENT DOCUMENTS 1,642,211  9/1927  Langdon ............................... 417/86
3,858,404  1/1975  Davis ...................................... 62/55

FOREIGN PATENT DOCUMENTS 0174269  3/1986  European Pat. Off. .
 355657  6/1922  Fed. Rep. of Germany .
2844719 10/1977  Fed. Rep. of Germany .
 286501  1/1971  U.S.S.R. .
2006324  5/1979  United Kingdom .

OTHER PUBLICATIONS

*Cryogenic Processes and Equipment*, ASME 1984, Kerney (ed).
Furuhama, S., Fakuma T. and Kashima, T., *Liquid Hydrogen Fuel Supply System to Hot Surface Ignition Turbocharged Engine*, Cryogenic Process and Equipment-1984, presented at the Fifth Intersociety Cryogenic Symposium, 105–113 (1984).

Primary Examiner—Leonard E. Smith
Assistant Examiner—Robert N. Blackmon
Attorney, Agent, or Firm—Wolf, Greenfield & Sacks

[57] ABSTRACT

In a method for conveying a liquid at or in the proximity of its boiling temperature, in particular, liquid hydrogen, by means of a pump which draws the liquid from a storage container through a suction entrance port, in order to prevent undesired bubble formation in the suction region, it is proposed that the pressure in the storage container be increased for a short time during the suction phase of the pump above the equilibrium pressure of the liquid in the storage container. An apparatus for performing this method is also described.

8 Claims, 1 Drawing Sheet

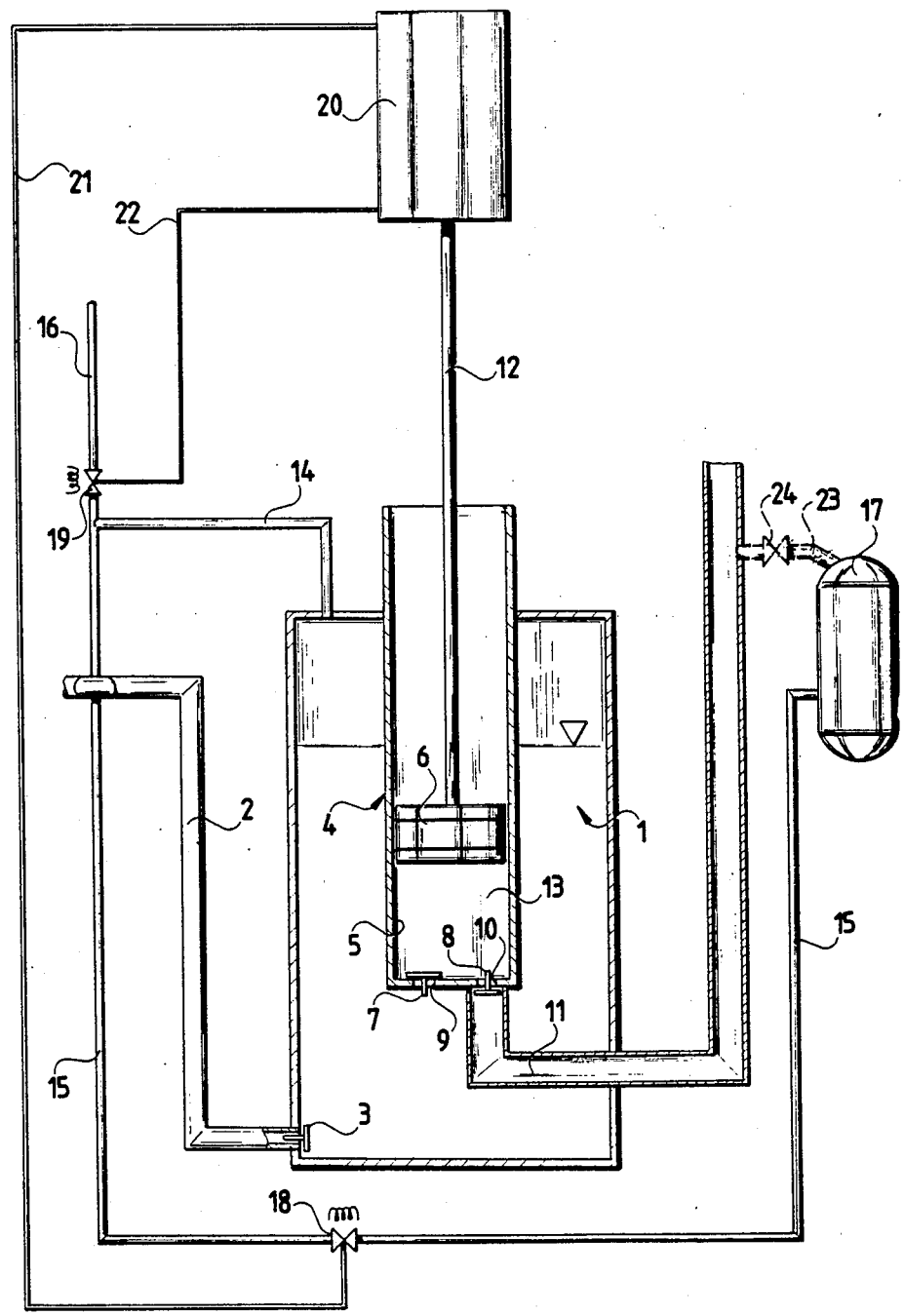

METHOD AND APPARATUS FOR CONVEYING A LIQUID

The invention relates to a method and an apparatus for conveying a liquid at or in the proximity of its boiling temperature, in particular, liquid hydrogen, by means of a pump which draws the liquid from a storage container through a suction entrance port.

When boiling liquids, for example, cryogenic hydrogen, are conveyed, a drop in the pressure of the liquid to be conveyed occurs in the region of the pump inlet during the suction phase and results in cavitation, i.e., bubble formation. This is an undesired effect because in the conveying phase of the pump, the vaporous substance which has been drawn in is liquified again owing to the increase in pressure occurring thereafter, and a considerable amount of the volume to be conveyed is therefore lost. This may even result in effective conveyance of the liquid being rendered impossible.

This effect cannot be counteracted by an increase in pressure in the storage container since this pressure increase merely results in a shift in the boiling temperature in the state of equilibrium. Therefore, also with such a static pressure increase in the storage container, a pressure drop in relation to the state of equilibrium would occur in the suction region of the pump and cause the undesired bubble formation.

It is known to eliminate the undesired bubble formation by, for example, introducing inertia effects in the liquid. Such measures include, for example, a pump design with an immovable piston and a movable cylinder or provision of so-called preconveying device. These are basically elements which are shaped in accordance with the liquid flow and in the admission phase conduct the liquid by inertia effects towards the suction entrance port of the pump, thereby eliminating a pressure drop in this region. These preconveying devices operate reliably but have the disadvantage that they enlarge to a considerable extent the geometrical dimensions of the pump with respect to both its length and its diameter. This creates structural difficulties, above all, where pumps of very small geometrical construction are required, for example, in a motor vehicle. In addition, conversion of existing conveying devices is not possible.

The object of the invention is to so improve a generic method that undesired bubble formation is eliminated during the suction phase of the conveying of the liquid, without the necessity for structural alteration of the pump itself.

This object is accomplished, in accordance with the invention, in a method of the kind described at the beginning by the pressure in the storage container being increased for a short time during the suction phase of the pump above the equilibrium pressure of the liquid in the storage container.

The pressure in the storage container is increased in a pulsed manner during the suction phase only. During the rest of the pumping cycle, the pressure is lowered again and, therefore, the pressure in the suction phase is considerably higher than the equilibrium pressure. This ensures elimination of bubble formation during the suction phase.

A further object of the invention is to provide an apparatus for performing this method. This object is achieved, in accordance with the invention, in an apparatus with a pump communicating on the suction side with a storage container for the liquid to be conveyed, by the closed storage container being connected to a pressure conduit which is connectable in synchronization with the motion of the pump during its suction phase to a pressure source, and by the storage container being relieved likewise in synchronization with the motion of the pump outside of the suction phase.

The term "relieved" means that the pressure increase caused by connection of the storage container to the pressure source is made to drop again. This may be achieved by, for example, connecting the storage container to a compensation tank at a lower pressure.

Structurally, this can be expediently accomplished by the pressure conduit being alternately connectable to a pressure source or a relief conduit, with the alternate connection being made by means of mechanically or electromagnetically actuatable valves.

It is particularly advantageous for the connection of the storage container to the pressure source and the relief conduit, respectively, to be controlled by the motion of the pump. This ensures that the pressure pulses are applied synchronously to the storage container.

In a preferred embodiment, provision is made for the pressure source to supply a gas which is different from the liquid to be conveyed and does not condense in it. If, for example, the liquid to be conveyed is hydrogen, the pressure source may supply gaseous helium.

In another embodiment, provision is made for the pressure source to supply in gaseous and/or liquid form the same substance as that of which the liquid to be conveyed consists. Accordingly, if the liquid to be conveyed is hydrogen, gaseous or liquid hydrogen or a mixture of gaseous and liquid hydrogen can be supplied.

In this case, it is particularly advantageous for the pressure source to comprise a supply tank which is fed from the discharge port on the pressure side of the pump. It is then unnecessary for an extraneous pressure source to be used. During each pumping cycle, a small amount of the liquid conveyed is fed under pressure to the supply tank. Therefore, medium under pressure for generating the pressure pulses is always made available by the operation of the pump itself.

A supply pipe for the liquid to be conveyed containing a non-return valve may open into the storage container. Provision of a non-return valve enables the pressure in the storage container to be increased for a short time.

The following description of preferred embodiments serves in conjunction with the appended drawing to explain the invention in greater detail. The drawing shows diagrammatically a conveying device to which pressure is applied for a short time in the suction phase.

The drawing shows the layout of a conveying device for conveying liquid hydrogen, only the most important parts being illustrated schematically therein. A storage container 1 closed on all sides contains liquid hydrogen in a state of equilibrium. Owing to the incomplete thermal insulation and the resulting heat input, the temperature in the container corresponds to the boiling temperature of the liquid hydrogen.

A feed pipe 2 opens into storage container 1. In the region in which it enters storage container 1, feed pipe 2 has a non-return valve 3 which opens in the inflow direction and closes in the opposite direction.

A conveying pump 4 with a pump cylinder 5, a piston 6 driven oscillatingly therein, an inlet valve 7 and an outlet valve 8 is arranged inside storage container 1 and dips into the liquid. The suction entrance port 9 of pump 4 opens directly into the liquid in storage container 1 whereas the pressure discharge port 10 opens into a pressure discharge pipe 11 which leads in a sealed manner out of storage container 1. Piston 6 is periodically moved up and down by a drive 20 by way of a drive rod 12 and the volume of the pump chamber 13 separate from the piston is, therefore, periodically altered.

A pressure pulse conduit 14 connected, on the one hand, to a pressure conduit 15 and, on the other hand, to a relief conduit 16 opens into storage container 1 on the upper side thereof. Pressure conduit 15 leads to a pressure tank 17 and contains a closable valve 18, for example, a magnetic valve. Relief conduit 16 leads, in a manner not apparent from the drawing, into a relief space, for example, a compensation space or directly into the environment. Relief conduit 16 contains a closable valve 19 which may similarly be a magnetic valve. The two valves 18 and 19 are connected by way of control lines 21 and 22, respectively, to the drive 20 of piston 6 and so opening and closing signals are fed to valves 18 and 19 in synchronization with the motion of piston 6. The association is such that during the suction stroke of piston 6, valve 18 in pressure conduit 16 is open and valve 19 in relief conduit 16 is closed, whereas in all other phases of the piston motion, the state of both valves 18 and 19 is reversed. Pressure pulse conduit 14 is thereby connected solely to pressure tank 17 during the suction stroke of piston 6, but during all other phases of the pump operation is connected solely to relief conduit 16.

Pressure tank 17 may be filled with a gas under positive pressure, for example, with helium gas if liquid hydrogen is being conveyed.

In a modified embodiment, pressure tank 17 is connected to pressure discharge pipe 11 by means of a supply pipe 23 which is illustrated in broken lines in the drawing. Supply pipe 23 contains a non-return valve 24 opening in the direction towards pressure tank 17. In this embodiment, pressure tank 17 is supplied with part of the liquid under pressure which is conveyed by the pump. Therefore, pressure tank 17 contains the same substance as that to be conveyed by the pump. This substance in the pressure tank may be gaseous, liquid or a two-phase liquid-vapor mixture.

In any case, the pressure of the medium in pressure tank 17 is greater than the pressure existing in the storage container when it is connected to the relief space by way of pressure pulse conduit 14 and relief conduit 16. This lower pressure in the storage container determines the equilibrium pressure in the storage container and hence the boiling procedure in the storage container.

During operation, a pressure pulse from pressure tank 17 is applied for a short time to the storage container during the suction stroke of piston 6 only. Therefore, the pressure in the storage container is increased for a short time during this phase. As a result of this, the pressure existing during the suction phase in the inlet area of the pump, also of a rapidly operating pump, is such that bubble formation does not occur. Once the suction stroke is completed, the pressure in the storage container is, however, lowered again to the normal equilibrium pressure and there is, therefore, no long-term shift in the boiling curve as a result of the increase in pressure. Accordingly, the state of equilibrium is basically determined by the pressure existing during relief of storage container 1.

It is advantageous that the described measure may also be applied to conveying devices which already exist without the pump itself having to be altered. It is sufficient for the storage container to be provided with an additional pressure pulse conduit and for a short increase in pressure and subsequent relief to be brought about alternately and in synchronization with the pump motion by way of this pressure pulse conduit.

Valves 18 and 19 may be switched over electrically in the described manner. In which case, use of magnetic valves is recommended. Mechanical switchover by direct mechanical connection with drive 20 is similarly possible.

What is claimed is:

1. A method for conveying a liquid at or in the proximity of its boiling temperature, in particular, liquid hydrogen, by means of a pump which draws the liquid from a storage container through a suction entrance port, characterized in that the pressure in said storage container is increased for a short time during the suction phase of said pump above the equilibrium pressure of the liquid in said storage container.

2. An apparatus for conveying a liquid at or in the proximity of its boiling temperature, in particular, liquid hydrogen, with a pump which is connected on the suction side to a storage container for the liquid which is to be conveyed, characterized in that said closed storage container is connected to a pressure pulse conduit which is connectable in synchronization with the motion of said pump during the suction phase to a pressure source so as to increase the pressure in said storage container above the equilibrium pressure of the liquid in said storage container during the suction phase of said pump, and in that said storage container is relieved likewise in synchronization with the motion of said pump outside of the suction phase.

3. An apparatus as defined in claim 2, characterized in that said pressure pulse conduit is alternately connectable to a pressure source or to a relief conduit.

4. An apparatus as defined in claim 2 or 3, characterized in that the connection of said storage container to said pressure source and said relief conduit, respectively, is responsive to the motion of the pump.

5. An apparatus as defined in claim 2, characterized in that said pressure source supplies a gas which is different from the liquid which is to be conveyed and which does not condense in the liquid which is to be conveyed.

6. An apparatus as defined in claim 2, characterized in that said pressure source supplies in gaseous and/or liquid form the same substance as that of which the liquid to be conveyed consists.

7. An apparatus as defined in claim 6, characterized in that said pressure source comprises a supply tank which is fed from a discharge port on the pressure side of said pump.

8. An apparatus as defined in claim 2, characterized in that a feed pipe for the liquid to be conveyed containing a non-return valve opens into said storage container.

* * * * *